United States Patent [19]
Bouet

[11] 3,958,402
[45] May 25, 1976

[54] CUTTER BLADE MOUNTING FOR A ROTARY MOWER

[75] Inventor: Jacques Eugene Bouet, Villeneuve-d'Ascq, France

[73] Assignee: International Harvester Company, Chicago, Ill.

[22] Filed: May 12, 1975

[21] Appl. No.: 576,830

[30] Foreign Application Priority Data
May 10, 1974 France .............................. 74.16280

[52] U.S. Cl. ................................................. 56/295
[51] Int. Cl.² ......................................... A01D 55/18
[58] Field of Search .............................. 56/295, 192

[56] References Cited
UNITED STATES PATENTS
3,662,529  5/1972  Glunk et al. ........................... 56/295

*Primary Examiner*—Russell R. Kinsey
*Attorney, Agent, or Firm*—Raymond E. Parks; Floyd B. Harman

[57] ABSTRACT

A cutter blade mounting for a rotary mower of the type having a disc carrying two or more blades. The blades are each mounted on a plurality of arms which are pivotally connected at one end thereof to the disc. At the swingable ends of each arm there is a stepped shaft member. The blades are each provided with an aperture to fit over one of the steps of each shaft; and the disc is provided with a plurality of apertures to fit over a second step of each shaft. A blade is inserted in the space between the swinging end of the arm and the disc. Then the arm is swung toward the disc, the one step of the shaft seating in the aperture of the blade and the second step seating in the aperture of the disc. The arm is then secured by fastening means against swinging which in turn clamps the blade to the disc.

10 Claims, 9 Drawing Figures

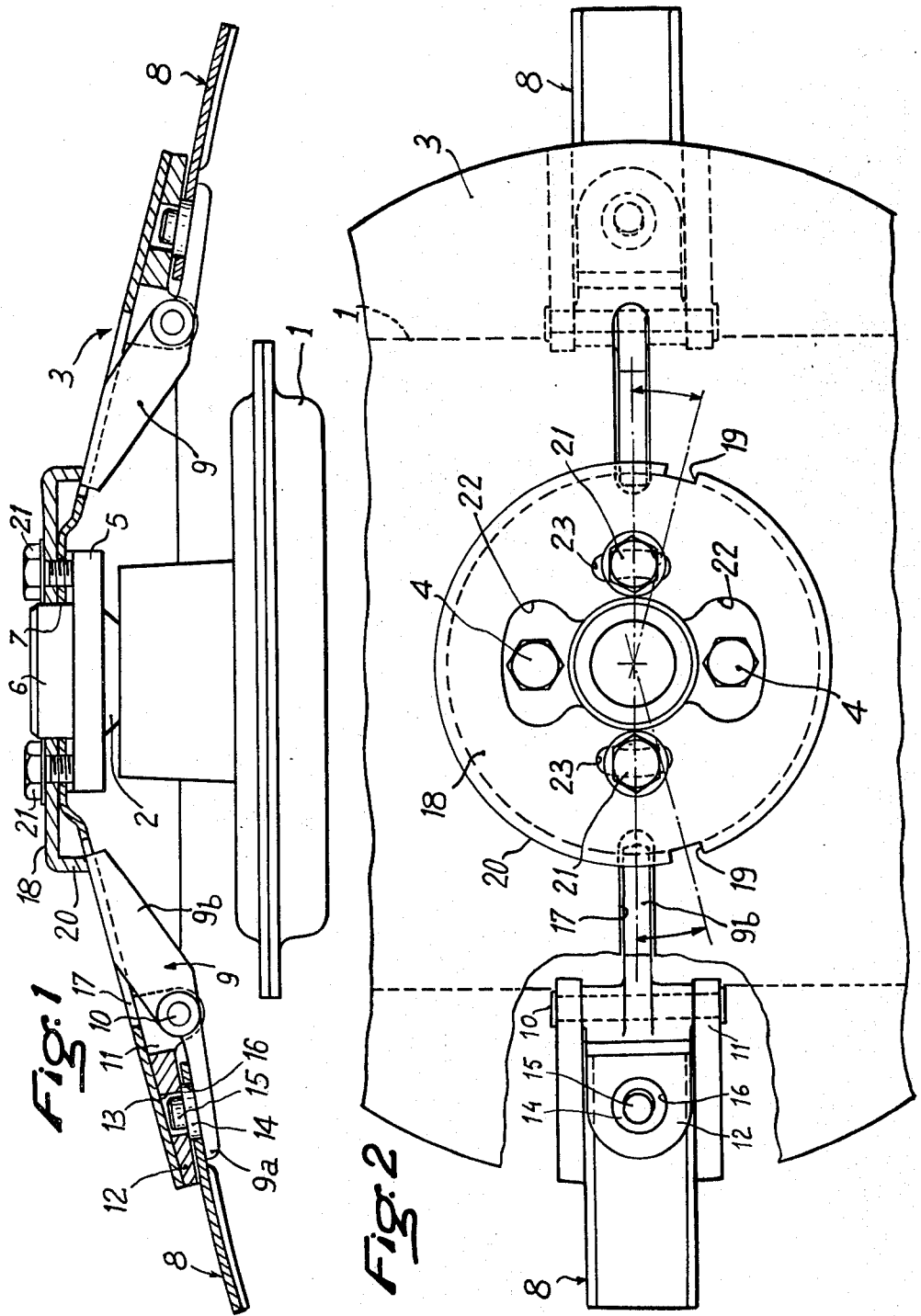

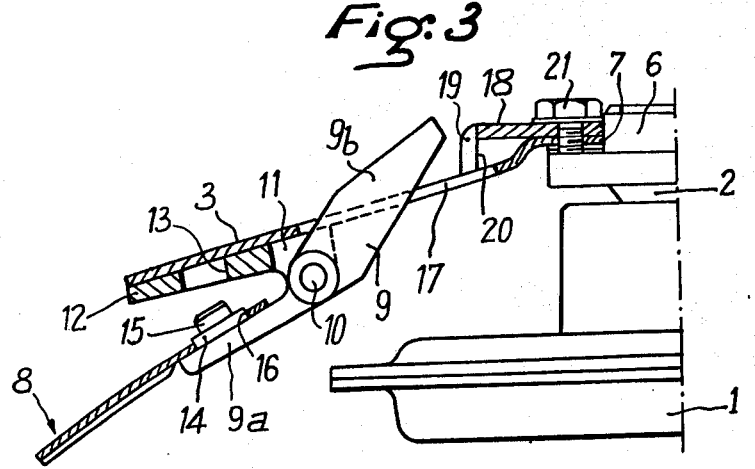
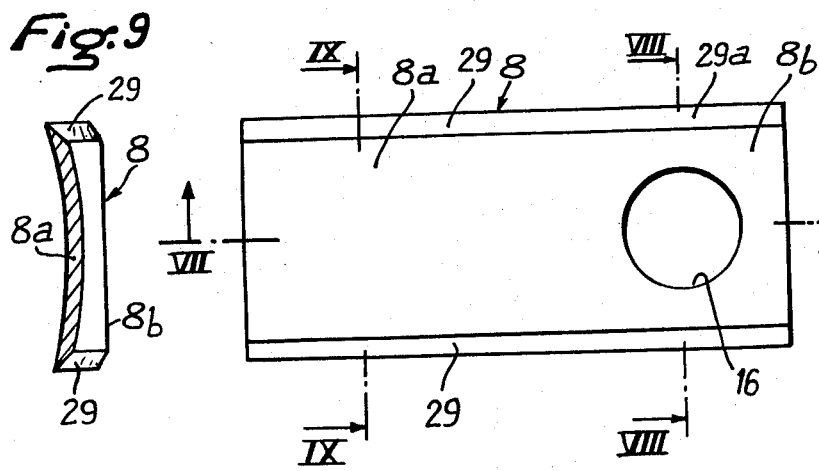
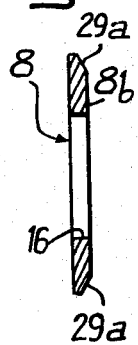
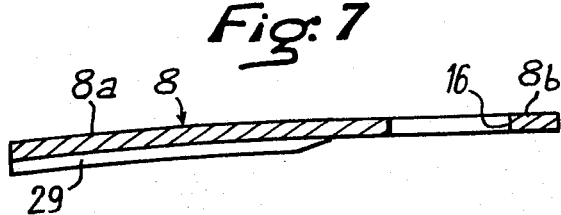

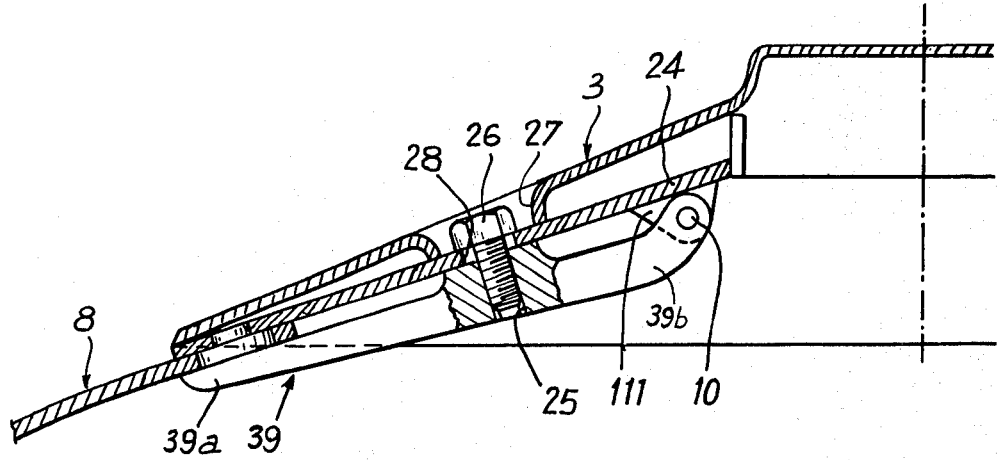
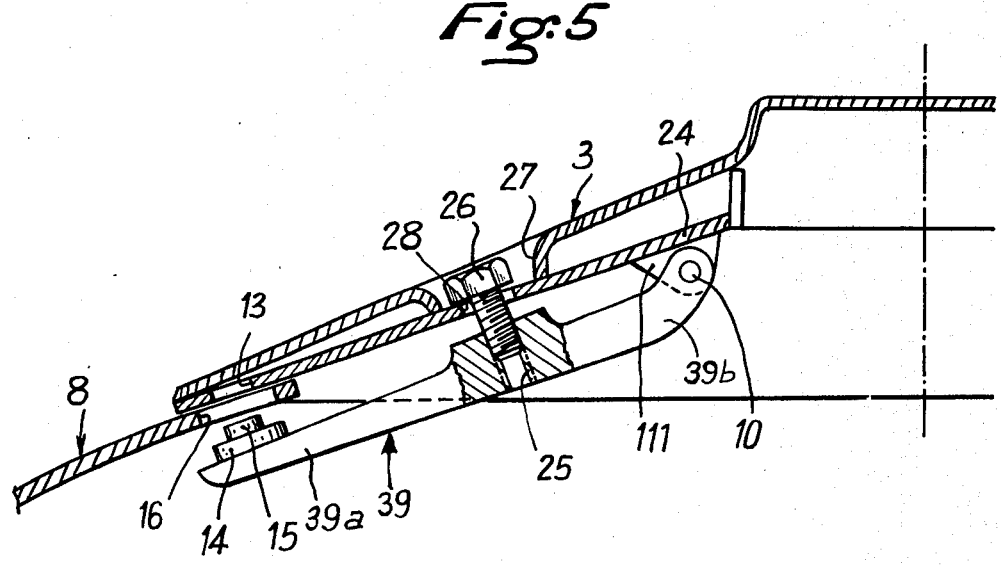

CUTTER BLADE MOUNTING FOR A ROTARY MOWER

CROSS REFERENCE TO A RELATED APPLICATION

This application is related to U.S. patent application Ser. No. 460,666, which was filed on Apr. 12, 1975, in the names of Uwe H. Martensen, Jacques E. Bouet and Arthur L. Cottenier. That application is based on an earlier filed French patent application No. 73-17127, having May 11, 1973 as the filing date.

BACKGROUND OF THE INVENTION

In general, this invention relates to a rotary type of mower which has a disc or rotor carrying at least two diametrically opposite cutters or blades. More specifically, this invention relates a means for connecting the cutters or blades to the disc or rotor.

FIELD OF THE INVENTION

This invention is adaptable for use on rotary mowers of the single and multiple disc or rotor types. In the multiple disc or rotor type, the discs or rotors may be staggered or aligned, arranged in sets or in pairs, and rotated to spin either in common or in dissimilar directions. The individual discs or rotors may comprise a plate or frusto-conical annular flange adapted to carry at the periphery and on its bottom face cutting elements which are pivotally mounted so as to take up an outwardly-extended work position under the action of centrifugal force or an inwardly-withdrawn position in the event an obstacle is encountered.

DESCRIPTION OF THE PRIOR ART

In the aforementioned U.S. patent application Ser. No. 460,666, a cutter blade is fastened to the periphery of a frusto-conical rotor by a bolt and nut. The blade is sleeved over a bushing and the bushing is sleeved over the shank of the bolt. Suitable compression means are provided between the blade and rotor to offer resistance to any free swinging of the blade.

In the U.S. Pat. No. 3,662,529, Glunk et al. May 16, 1972, the cutter blade is connected to the periphery of the frusto-conical rotor by a leaf spring arm. One end of the arm is fastened to the rotor. The springing end of the arm carries a pin which passes through a hole in the blade and fits into an aperture in the rotor. In two embodiments, centrifugal force is used to retain the pin in the aperture and in a third embodiment the springing end of the arm is pinned to the rotor.

Another example of a quick-assembly type of a mower knife mounting is shown in the U.S. Pat. No. 3,604,189, Harer, Sept. 14, 1971. In this reference the cutter blade has an elongated slot which passes over an elongated head portion of a bolt mounted on the rotor. A leaf spring arm is mounted on the rotor so that the body portion extends in the direction of rotation of the rotor. The springing end of the arm, which is provided with an elongated hole, passes over the elongated headed portion of the pin and presses the cutter blade and holds it on the shank portion of the bolt.

An additional example of a quick assembly type of mower knife mounting is shown in the French Pat. No. 71-15302 (2,090,919), published 20 December 1971. In this reference, a stub shaft is fixed to the rotor. The cutter is mounted over the shaft. A leaf spring arm is fixed to the rotor and has an aperture which passes over the stub. The end of the arm has a finger which presses the cutter against the rotor.

SUMMARY OF THE INVENTION

There is provided in a rotary mower, which has a rotor disc carrying a pair of diametrically aligned cutters on the underside of the disc, an improved cutter mounting. The mounting comprises a pair of lever arms which are pivotally mounted symmetrically to the underside of the disc. Each of the arms has an outboard end which extends in a radial direction with respect to the axis of the disc and each outboard end is swingable in a vertical plane. On the outboard end of each arm there is mounted a shaft haaving two stepped diameters. A pair of knives having holes are pivotally on one step of each shaft. The one steps each have a height greater than the thickness of each knife. The underside of the disc is provided with a pair of recesses which align axially with the shafts and are of size which admits only the second step of each shaft. Securing means carried on the disc lock the arms against vertical swinging and abut the one steps about the periphery of the recesses which provides a clearance space between the arms and the underside of the disc for swinging the knives about the axes of the shaft.

Further, in accordance with the invention, a rotary mower comprising a plurality of aligned rotors each carrying cutting elements is characterized in that the mower is provided in addition and for the purpose of supporting each cutting element on its rotor with an arm which is capable of displacement in a substantially vertical plane of the rotor in order to ensure that the outer extremity of said arm which is close to the edge of the rotor is capable of moving between a first position of retention of the cutting element in which said element which has an assembly bore is retained without clamping on the bottom face thereof by the arm aforesaid and on the top face thereof by the rotor itself, the bore of said cutting element being traversed by a pivot which extends between the arm and the rotor itself and a position of release of the cutting element in which the outer extremity of the arm is withdrawn from the bottom face of the rotor in order that the cutting element may be freed from the pivot and separated from the rotor, means being provided for maintaining the arm in the first position in a releasable manner.

In accordance with one embodiment of the invention, the arm is pivotally mounted on a horizontal pivot provided beneath the rotor.

In accordance with another property of the invention, each cutting element is constituted by a thin plate within the rectangular assembly which is curved downwards both in the transverse direction and in the longitudinal direction at least in the portion which projects radially from the rotor.

BRIEF DESCRIPTION OF THE DRAWING

Further properties and advantages of the invention will become apparent from a reading of the complementary description with reference to the various figures of the drawing in which:

FIG. 1 is a side, partial cross-sectional, view of the rotor showing one embodiment of the novel cutter blade mounting assembly;

FIG. 2 is a top view of the embodiment shown in FIG. 1, with parts broken away;

FIG. 3 is a similar to FIG. 1 but showing the disengaged position of the cutter blade mounting;

FIG. 4 is a side, partial cross-sectional view of the rotor showing a second embodiment of the novel cutter blade mounting assembly;

FIG. 5 is similar to FIG. 4 but showing the disengaged position of the cutter blade mounting;

FIG. 6 appearing on the sheet with FIG. 3, is a top view of a cutter blade which is incorporated in the two embodiments of the assembly;

FIG. 7 is a cross-section of the blade shown in FIG. 6 taken on line VII—VII;

FIG. 8 is a cross-section of the blade shown in FIG. 6 taken on line VIII—VIII; and FIG. 9 is a cross-section of the blade shown in FIG. 6 taken on line IX—IX.

DESCRIPTION OF THE PREFERRED EMBODIMENT

The following description is given with reference to a mower of the cutting-plate type but it will be readily understood that the invention is also applicable to drum-type mowers.

The mower which is shown partially in FIGS. 1 to 3 has an elongated flat frame 1 which extends transversely to the direction of forward motion. One or more vertical shafts 2 may be provided on the frame. The shafts are placed in alignment and driven in pairs in opposite directions by a gear-type mechanism (not shown) which is contained in the frame 1. Each shaft 2 is fitted with a cutting plate or rotor 3 having the general shape of an inverted dinner-plate or cone frustum. Each cutting-plate or disc 3 is rigidly fixed to its shaft 2 by means of screws 4 screwed into an end-plate 5 of the shaft 2. A pivot pin or shaft 6 which is passed through a central bore 7 of the rotor 3 permits centering of this latter on the shaft.

Each rotor 3 is provided at its periphery and beneath its bottom face with two cutter blade elements 8 or knives which project radially from the contour of the rotor or disc 3 and are located in diametrically opposite relation. The knives are mounted to rotate freely on the rotor so as to be capable of taking up an active cutting position as shown in FIGS. 1 and 2 under the effect of centrifugal force and so as to be capable of withdrawing beneath the rotor when they encounter a hard obstacle such as a stone, for example.

A pair of symmetrical arms 9 are provided for mounting and holding the cutters or knives 8 in place on the disc 3. Since the arms 9 are symmetrical, a description directed to one of the arms will suffice for the other arm. As shown in FIGS. 1 and 2, the arms 9 extend radially outward from the axis of the rotor 3 and are adapted to swing about a horizontal axis on a vertical plane perpendicular to the axis of the rotor. Each arm 9 is pivotally mounted between its outboard 9a and inboard 9b ends on a pin 10. The pin 10 is carried by two arms 11 of a bifurcated bracket member 12. A recess or hole 13 is provided in a flat portion of the member 12. The bifurcated bracket members 12 are fixed to the concave-up or dished or underside of the cutter plate 3 by any suitable means such as by welding for example.

The outboard portion 9a of each arm 9, is provided with a flat surface for seating the knife 8. On the surface there is mounted a two-stepped stub shaft or pin 15. One step 14 is of a diameter which fits into a hole 16 which is provided in the knife 8, and is of a height slightly larger than the thickness of the knife 8 to provide a space between the body portion of the bracket 12 and the knife, so that the knife can pivot on said one step or bearing flange 14. The second step 15 is of a smaller diameter and is of a length sufficient to pass into the recess or hole 13 in the bracket member 12. It is to be noted that the hole 13 is of a size which does not permit the admission of the annular flange 14 so that the flat portion of the bracket 12 operates as stop against the flange 14.

With reference to FIG. 6, there is formed in the flat rear portion of each knife 8 a bore 16 having a diameter which is only slightly larger than that of the annular flange 14. Each knife has a thickness which is less than the height of the annular flange in order to permit free rotational displacement of the knife about the pivot which is formed by the annular flange when the bore 16 of each knife 8 is placed over the annular flange. The knife has a generally rectangular shape and, at least in its cuttting zone 8a, said knife is curved or cambered downwards (when the knife is considered as mounted on the mower) both in the transverse direction and in the longitudinal direction wherein said knife is preferably flat in the zone 8b in which it is mounted on the mower in order to be capable of pivotal displacement. In the zone 8b, the knife has a bore 16, for example in order to receive the stud or pivot 15.

Each knife is provided at least in the cutting zone 8a and on each of its long sides with a cutting edge 29 which can be extended in the mounting zone 8b by a chamfer 29a. By virtue of its double curvature, the knife 8 has enhanced rigidity with respect to flat knives; the knife can thus be formed by means of a thin plate which cause for re-grinding at far less frequent intervals than other type of knives of substantial thickness. A further advantage lies in the fact that one and the same knife can be employed on a cutting-plate or drum 3 which rotates either in one direction or in the other.

During operation, the knife is capable of rotating freely about the pivot 15 by virtue of its flat portion 8b and without being hindered by the cutting-plate since it is cambered downwards.

Referring back to FIG. 1, the inboard portion 9b or tail-piece of the arm 9 which extends between the pivot-pin 10 and the axis of the rotor or cutter-plate 3 is intended to cooperate with means 18 for locking the pair of arms 9. The inboard end or tail-piece 9b of each arm extends radially toward the axis of the rotor 3 and has a flat upper surface. A pair of radially extending slots 17 are provided in the cutter disc 3 above and parallel with the inboard ends 9b of each arm 9. Each slot 17 is sized to permit the passage of the respective end 9b. In order to lock the arms 9 in position, provision is made on the top surface of the cutter-plate 3 for a coaxial cup or cylinder 18 having two non-diametrical notches 19 formed in the cylindrical or annular skirt 20 which sits on top of the cutter-plate 3.

The cup 8 with the skirt 20 depending over the end-plate 5 is secured to the end-plate 5 of the shaft 2 by means of screws or bolts 21 which pass through the cup 18 and the cutter-plate 3. In order to permit rotational displacement of the cup 18 on the cutter-plate 3, the base of cup 18 is provided with a pair of recesses 22 in the zone of the screws or bolts 4 which serve to mount the cutter-plate 3 on the end-plate 5 and is further provided with arcuate slots 23 through which the screws or bolts 21 pass.

The tail-pieces 9b of the pair of arms 9 and the non-diametrical notches 19 are so arranged that in the absence of a notch vertically aligned or opposite to a tail-piece 9b, both tail-pieces jut through the slots 17 and butt against the annular flange or skirt 20 as shown in FIGS. 1 and 2. When one of the non-diametrical notches is located opposite to a respective tail-piece, the tail-piece 9b passes through the slot 17 into the vertically aligned notch 19, as shown in FIG. 3.

The advantage of the two non-diametrical notches 19 is that only one knife at a time can be mounted or removed from the cutter-plate 3. This permits the operator to concentrate his efforts on one knife. Otherwise, he would have to seek assistance for raising both arms 9 at the same time and holding both arms in the raised position while rotating the cup 18 and locking the arms in place.

The operation of the knife securing means 18 will now be explained. The bolts 21 are loosened and the cup 18 is rotated to one of the two angular positions shown in FIG. 2, thereby vertically aligning one of the notches 19 in the skirt 20 of the cup 18 with the respective slot 17 in the disc 3 and with the inboard end 9b of the associated arm 9. This releases the inboard end 9b and it passes through the slot 17 into the notch 19 and drops the outboard end 9a releasing the knife 8 as shown in FIG. 3. In this position, the stud 15 is released from the hole 13 and is dropped a sufficient distance below the member 12 to permit the knife 9 to be passed between the disc 3 and end 9b and over the annular flange 14. The operator then rocks the inboard-end 9a of the arm 9 until the outboard end or tail-piece 9b withdraws through the vertically aligned notch 19 and slot 17 and is flush with the top face of the cutter-plate 3. He then rotates the cup 3 so as to move the vertically aligned notch 19 away from its respective slot 17. When the tail-piece 9b is moved downwards, the outboard end portion 9a moves upwards and confines the knife 8 on the bearing flange 14. The knife is capable of pivoting about the flange 14 as explained previously.

In order to mount or remove the other or second knife, it is only necessary to rotate the cup further in the locking direction of the first knife and bring the other notch 19 to the other angular position shown in FIG. 2 which vertically aligns with the other slot 17 and other inboard end 9b. After the second knife is mounted and the second arm 9b is withdrawn from the second notch 19 and associated slot 17, the cup is rotated back to the central notch position shown in FIG. 2 and the bolts 21 are tightened securing the cup 18 and locking the arms 9 in the operating position of the knives 8.

By virtue of the angular displacement of the notches 19 with respect to the slots 17, it is possible to mount and to remove one knife without thereby releasing the other knife if this latter has already been fitted and without entailing any need to handle the two knives at the same time.

By means of the fastening device in accordance with the invention, the knives are securely and positively locked in position without any danger of accidental release and without any projecting portion on the top face of the cutter-disc 3 which would be liable to produce an undesirable ventilating effect.

DESCRIPTION OF AN ALTERNATIVE PREFERRED EMBODIMENT

There is shown, in FIG. 4, a second embodiment of the cutter arm, the bifurcated member and the means for locking the cutter arm. In this embodiment the bifurcated member comprises a plate or disc 24 mounted or fixed to the underside of the cutter plate 3. The plate 24 has a pair of brackets 110 on which is pivotally mounted the inner end 39b of the arm 39. A pin 10 is carried by the two bearing-brackets 110 which are secured to the bottom surface of the lower plate 24. Between the outboard and inboard ends 39a and 39b of the arm 39 a threaded hole 25 is provided which receives an adjustment screw 26. In place of the radial slot in the cutter plate 3, an opening or recess 27 is provided for the head of the bolt 26. The opening 27 is axially aligned with a smaller hole 28 formed in the lower plate 24. The diameter of the smaller hole 28 accepts the shank or stem of the screw 26 but not the head of the bolt so that the head of the bolt bears on the top surface of the lower plate 24. The cutter-plate 3, the lower plate 24 and the bolt head are so arranged that the bolt head does not project above the top surface of the cutter-plate 3. The lower plate 24 is provided near the periphery of the cutter-plate with a hole 13 which is similar to the hole in the bracket member 12 of FIG. 1. The outboard end or outer portion 39a of the arm 39 is identical with the outboard end portion 9a of the arm 9 in FIG. 1.

Mounting and removal of the knife 8 are carried out by pivotal displacement of the arms as a result of tightening and lossening of the screw 26.

As another alternative, the annular flange 14 and the stud 15 could be provided on the cutter-plate 3 whilst the opening or bore 13 could be formed in the outboard end portion 9a/39b of the arm 9/39. It is found preferable, however, to place the annular flange on the arm 9/39 since the knife is thus held by the arm on which it rests without sliding and this applies both at the time of assembly and disassembly.

The embodiments of the invention in which an exclusive property or privilege is claimed are defined as follows:

1. In a rotary type of mower having a rotor disc carrying a pair of diametrically positioned cutters on the underside of the disc, an improved cutter mounting, comprising:

a pair of rigid lever arms pivotally mounted symmetrically to the underside of the disc, each of the arms having an outboard end extending in a radial direction toward the periphery of the disc, and each of the outboard ends being swingable about the pivotal axis in a vertical plane;

a pair of shafts having two stepped diameters respectively mounted to the outboard end of the lever arms;

the cutters are a pair of elongated blades having a hole at one end of a diameter journalled fitting one step of the shafts and are respectively mounted thereon;

the one step of the shafts having a height larger than the thickness of the blades to provide a clearance between the underside of the disc and the blades;

the underside of the disc having a pair of round recesses aligned with the second step of the shafts and are of a diameter to admit only the respective second step of the shafts; and arm securing means carried on the disc for locking the outboard end of the arms against vertical swinging and for seating the second step of the shafts in the respective recesses and for abutting the one step about the periphery of the respective recesses and thereby for anchoring the blades to the disc.

2. The invention according to claim 1 wherein the arms include an inboard end extending radially toward the axis of the disc, and the arms being pivotally mounted to the underside of the disc between the ends thereof;

and the disc having a radially extending slot for each inboard end permitting the passage of said inboard ends; and the arm securing means comprising an inverted cylindrical cup member carried on the top side of the disc coaxial with the axis thereof, the skirt of the cup member having two non-diametrical notches of a size permitting the passage of the inboard end of the arms upon selective rotation of the cup about the axes to two angular positions where each notch is vertically aligned with a respective slot and the associated inboard end of the arm;

and bolt means for securing the cup to the disc against relative rotation.

3. The invention according to claim 1 wherein the arms include an inboard end extending radially toward the axis of the disc, and the inboard end of the arms being pivotally mounted to the underside of the disc;

and the arm securing means comprise a bolt for each arm, the heads of the bolts are countersunk into the topside of the disc with the shanks passing through holes provided in the disc, each of the arms having a threaded hole, and the bolts being screwed into the threaded holes.

4. The invention according to claim 1 further including a pair of bifurcated elongated members fixed to the underside of the disc; the arms being pivotally mounted in the fork of the members, and the members having an outboard end with the round recess therein.

5. The invention according to claim 2 further including a pair of bifurcated elongated members fixed to the underside of the disc; the arms being pivotally mounted in the fork of the members, and the members having an outboard end with the round recess therein.

6. The invention according to claim 3 further including a pair of radially extending members fixed to the underside of the disc, the members having a forked inboard end and the arms being pivotally mounted in the forked end, and the members having an outboard end with the round recess therein and having the hole for the shank of the bolt between the ends thereof.

7. The invention according to claim 2 wherein the closed end of the cup is provided with two arcuate slots for the bolt means, the angular length of the slots corresponding to the two angular positions of the notches.

8. The invention according to claim 2 wherein both notches are located on one-half of the cup.

9. The invention according to claim 8 wherein the closed end of the cup is provided with two arcuate slots for the bolt means, the angular length of the slots corresponding to the two angular positions of the notches.

10. The invention according to claim 1 wherein the blades are rectangular in shape, the elongated sides being bent to form legs, the elongated flat surface being cambered to form cutting edges at the bends, and the legs in the zone of the hole being removed and the cambered surface being flattened a predetermined longitudinal distance which is sufficient to permit the blades to clear the outboard end of the arms.

* * * * *